US008595521B2

(12) United States Patent
Singla et al.

(10) Patent No.: US 8,595,521 B2
(45) **Date of Patent: *Nov. 26, 2013**

(54) INCREASING MEAN TIME BETWEEN FAILURES FOR POWER SUPPLIES

(71) Applicant: Juniper Network, Inc., Sunnyvale, CA (US)

(72) Inventors: Ankur Singla, San Jose, CA (US); Harshad Nakil, San Jose, CA (US); Surendra Patel, Tracy, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/685,115

(22) Filed: Nov. 26, 2012

(65) Prior Publication Data

US 2013/0144454 A1 Jun. 6, 2013

Related U.S. Application Data

(63) Continuation of application No. 13/012,859, filed on Jan. 25, 2011, now Pat. No. 8,321,698, which is a continuation of application No. 11/849,400, filed on Sep. 4, 2007, now Pat. No. 7,904,734.

(51) Int. Cl.

| | |
|---|---|
| ***G06F 1/00*** | (2006.01) |
| ***G06F 11/30*** | (2006.01) |
| ***G06F 11/00*** | (2006.01) |

(52) U.S. Cl.
USPC .............................. 713/300; 713/340; 714/14

(58) Field of Classification Search
USPC .............................. 713/300
See application file for complete search history.

(56) References Cited

U.S. PATENT DOCUMENTS

| | | | | |
|---|---|---|---|---|
| 4,860,188 | A * | 8/1989 | Bailey et al. | 363/65 |
| 5,894,413 | A | 4/1999 | Ferguson | |
| 6,614,133 | B2 * | 9/2003 | Belson et al. | 307/58 |
| 7,002,263 | B2 | 2/2006 | Inn et al. | |
| 7,002,265 | B2 | 2/2006 | Potega | |
| 7,045,914 | B2 * | 5/2006 | Liu et al. | 307/64 |
| 7,468,597 | B2 | 12/2008 | Jones et al. | |
| 7,720,546 | B2 | 5/2010 | Ginggen et al. | |
| 7,904,734 | B1 | 3/2011 | Singla et al. | |
| 8,321,698 | B2 | 11/2012 | Singla et al. | |
| 2006/0003713 | A1 | 1/2006 | Ouzillou et al. | |
| 2006/0061409 | A1 | 3/2006 | Wakayama et al. | |
| 2007/0030644 | A1 | 2/2007 | Hall et al. | |
| 2007/0208753 | A1 | 9/2007 | Mitchell et al. | |

* cited by examiner

*Primary Examiner* — Suresh Suryawanshi
(74) *Attorney, Agent, or Firm* — Harrity & Harrity LLP

(57) ABSTRACT

A redundant power supply may obtain a rule for increasing mean time between failures (MTBF) for a first internal power supply and a second internal power supply connected to an electronic device, apply the rule to the first and second power supplies, activate the second internal power supply based on the rule to permit the second internal power supply to provide power to the electronic device, and deactivate the first internal power supply based on the rule.

20 Claims, 5 Drawing Sheets

400

402 RECEIVE/SELECT CRITERIA/RULES FOR ROTATING PARALLEL POWER SUPPLIES

404 DETERMINE POWER NEEDS OF POWER CONSUMERS

406 RECEIVE/DETERMINE SENSOR INFORMATION

408 DETERMINE A NUMBER OF PARALLEL POWER SUPPLIES THAT ARE NEEDED TO SUPPLY POWER TO THE POWER CONSUMER

410 DETERMINE THE NUMBER OF PARALLEL POWER SUPPLIES THAT MAY BE PLACED ON THE STAND-BY MODE

412 IDENTIFY A SET OF PARALLEL POWER SUPPLIES THAT ARE TO BE PLACED ON THE STAND-BY MODE BY APPLYING THE RECEIVED CRITERIA/RULES

414 DETERMINE A FUTURE ACTIVE ROSTER

416 ACTIVATE THE PARALLEL POWER SUPPLIES THAT ARE IN THE ACTIVE ROSTER

418 PLACE THE PARALLEL POWER SUPPLIES THAT ARE DETERMINED TO BE IN THE STAND-BY MODE IN THE STAND-BY MODE

INCREASING MEAN TIME BETWEEN FAILURES FOR POWER SUPPLIES

RELATED APPLICATION

This application is a continuation of U.S. patent application Ser. No. 13/012,859, filed Jan. 25, 2011, (now U.S. Pat. No. 8,321,698), which is a continuation of U.S. patent application Ser. No. 11/849,400, filed Sep. 4, 2007 (now U.S. Pat. No. 7,904,734), which are incorporated herein by reference.

BACKGROUND

A redundant power supply (RPS) may supply power to a device as means for increasing overall up-time for a device, using multiple power supplies to increase reliability or supplying power when the primary power supply for the device fails or otherwise can no longer deliver sufficient power to the device. The ability of the RPS to protect the device against power failures over time may depend on the reliability of power supplies that are internal to the RPS.

SUMMARY

According to one aspect, a method may include obtaining a rule for increasing mean time between failures (MTBF) for a first internal power supply and a second internal power supply connected to an electronic device, applying the rule to the first and second power supplies, activating the second internal power supply based on the rule to permit the second internal power supply to provide power to the electronic device, and deactivating the first internal power supply based on the rule.

According to another aspect, a redundant power supply may include first and second parallel power supplies for providing power to an electronic device and a controller. The controller may be configured to identify, based on a rule, that the first parallel power supply is to be placed in a stand-by mode. In addition, the controller may be further configured to activate the second parallel power supply to provide the electronic device with power, and place the first parallel power supply in the stand-by mode.

According to yet another aspect, a redundant power supply may include means for receiving operational parameters of a first and second internal parallel power supplies, means for applying a rule for increasing mean time between failures (MTBF) to the first and the second internal power supplies, means for placing the second internal power supply in an active roster if the rule applies to the operational parameters of the first internal power supply, means for activating the second internal power supply, and means for deactivating the first internal power supply.

DETAILED DESCRIPTION OF PREFERRED EMBODIMENTS

The following detailed description refers to the accompanying drawings. The same reference numbers in different drawings may identify the same or similar elements.

The term "healthy" power supply, as used herein, may refer to a power supply that is capable of delivering a specified amount of power. Conversely, as used herein, the term "unhealthy" power supply may refer to a power supply that is incapable of supplying the specified power.

The term "active roster," as used herein, may refer to a list of power supplies that are either currently supplying power or are to be supplying power to power consuming devices.

Figure 1:
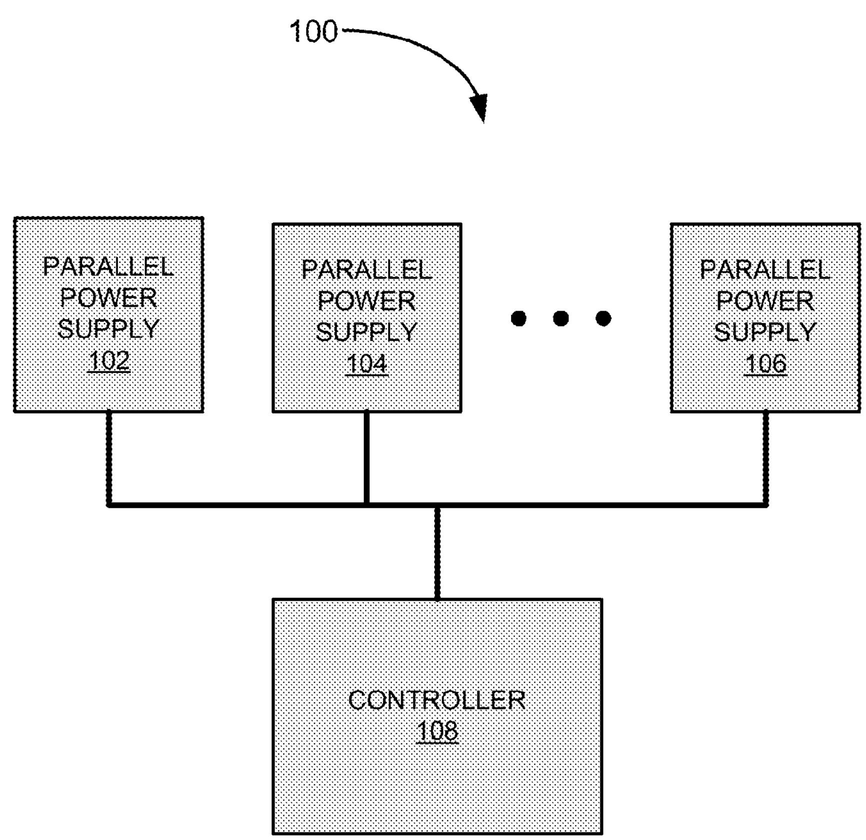
FIG. 1 illustrates a portion of a redundant power supply (RPS) system for increasing mean time between failures.

FIG. 1 is an overview of an RPS system 100 that increases mean time between failures (MTBF) of its internal power supplies. As shown, RPS system 100 may include parallel power supplies 102, 104 . . . , 106, and a controller 108. Parallel power supplies 102-106 may provide power to a power consumer (not shown). Controller 108 may continuously rotate one or more parallel power supplies 102-106 to supply power and replace the rotated-out power supplies with one or more other ones of parallel power supplies 102-106. By rotating parallel power supplies 102-106, controller 108 may prevent parallel power supplies 102-106 from being under stressful conditions that shorten their lifespan, and consequently, may increase the MTBF of parallel power supplies 102-106 within RPS system 100.

Figure 2:
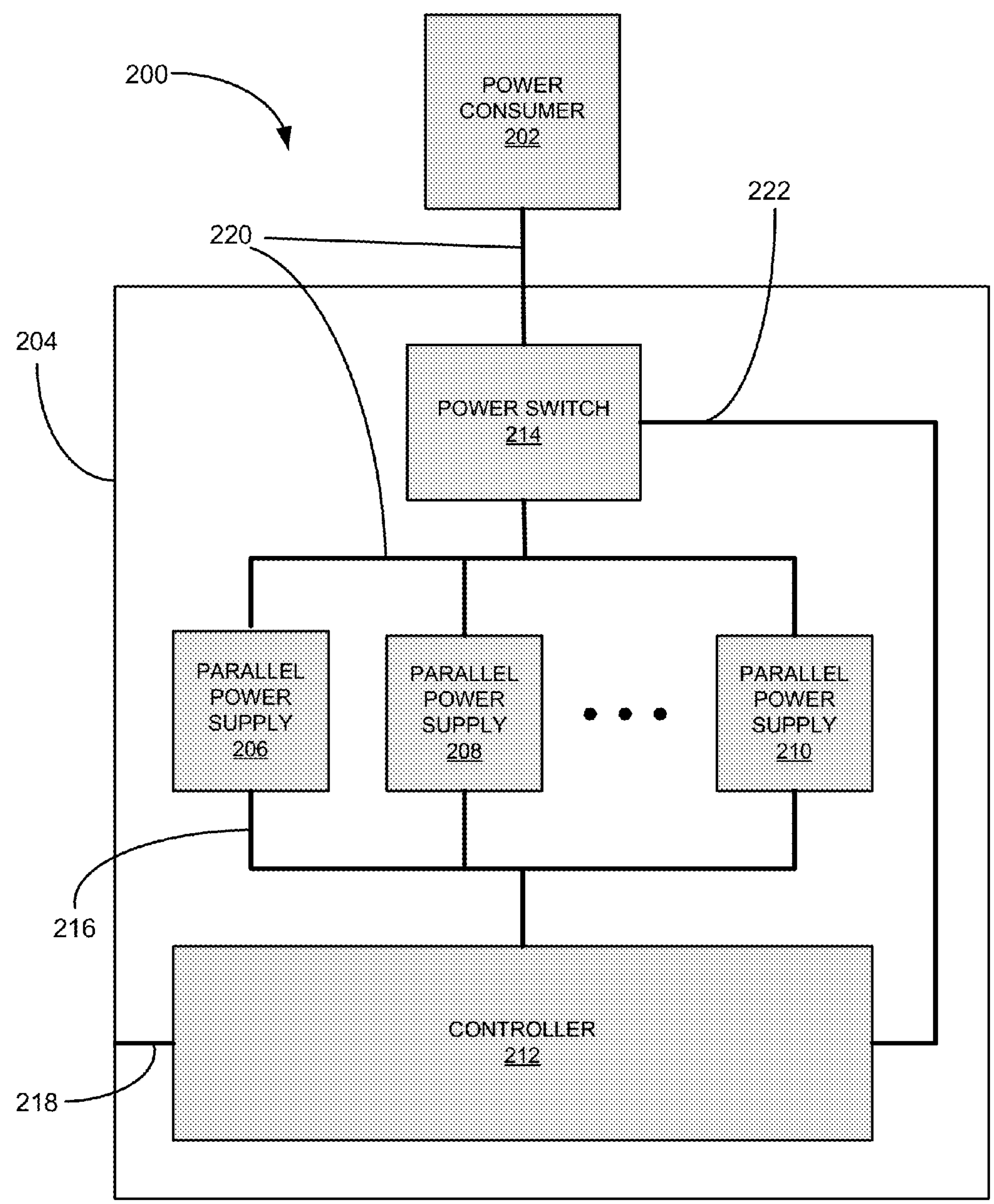
FIG. 2 is a block diagram of an exemplary system in which concepts described herein may be implemented.

FIG. 2 shows an exemplary RPS system 100 in which concepts described herein may be implemented. As shown, RPS system 100 may include power consumer 202 and RPS module 204. In some implementations, power consumer 202 and RPS module 204 may be part of a single device (e.g., a computer). In other implementations, power consumer 202 may be external to RPS module 204. In still other implementations, RPS system 100 may include additional power consumers, each of which may require the same or different input power.

Power consumer 202 may include a device and/or a component that consumes power (e.g., a motherboard of a computer, a speaker, a computer, etc.). In some implementations, power consumer 202 may include one or more devices that provide at least some of its own internal power or are attached to external power supplies. In such implementations, power consumer 202 may rely on RPS module 204 for supplemental power and/or protection against internal/external power supply failures. In other implementations, power consumer 202 may receive all of its power from RPS module 204.

RPS module 204 may include a device for providing direct current (DC) power. If attached to power consumer 202, RPS module 204 may have the ability to sustain power consumer 202 when power supplies that are internal to or externally connected to power consumer 202 fail. If power consumer 202 does not include internal power supplies, RPS module 204 may meet all of power needs of power consumer 202.

As further illustrated in FIG. 2, RPS module 204 may include parallel power supplies 206-210, a controller 212, a power switch 214, communication lines 216, a controller line 218, power buses 220, and power switch line 222. In other implementations, RPS module 204 may include fewer, additional or different elements or connections than those illustrated in FIG. 2.

Parallel power supplies 206-210 may include devices for producing power that can be delivered to power consumer 202. In some implementations, parallel power supplies 206-210 may be capable of generating power in excess of the amount consumed by power consumer 202. In such cases, only some of parallel power supplies 206-210 may be actively engaged in supplying power to power consumer 202, and others may be in a stand-by mode. Any of the parallel power supplies in the stand-by mode may replace a parallel power supply that fails and therefore, may provide redundancy protection.

Controller 212 may include a device for monitoring and providing command signals to parallel power supplies 206-210 and power switch 214. Controller 212 may monitor parallel power supplies 206-210 based on sensor signals that are related to operating parameters of parallel power supplies 206-210, such as temperature, power levels, fan speed, etc. Furthermore, controller 212 may use the signals to determine which of parallel power supplies 206-210 may be rotated-out of an active roster and replaced with parallel power supplies that are in the stand-by mode. In some instances, controller 212 may rotate parallel power supplies 206-210 partly based on criteria/rules that are inputted by a user, such as a deficit round-robin rule.

While FIG. 2 shows controller 212 as being part of RPS module 204, in other implementations, controller 212 may be part of power consumer 202 (e.g., a processor in a computer). Furthermore, controller 212 may be implemented as hardware, software, and/or a combination of both. In some implementations, controller 212 may be implemented as part of an application-specific integrated circuit (ASIC) or a field-programmable gate array (FPGA).

Power switch 214 may connect or disconnect parallel power supplies 206-210 from power consumer 202. If controller 212 determines that power consumer 202 is shorted, controller 212 may cause power switch 214 to disconnect power consumer 202 from parallel power supply 204.

Communication lines 216 may include components for relaying signals that describe operating conditions of parallel power supplies 206-210 to controller 212 and for delivering commands from controller 212 to parallel power supplies 206-210. The commands may indicate which of parallel power supplies 206-210 may actively supply power and/or which ones may be in the stand-by mode. If a parallel power supply fails, controller 212 may prevent, via communication lines 216, the failed parallel power supply from being active in RPS system 200.

Controller line 218 may provide a channel via which one or more external devices may communicate and/or interact with controller 212. For example, controller line 218 may provide a path to a network, to which a management station may be attached (not shown). In such implementations, the management station may receive information about internal operating conditions of RPS module 204 from controller 212, and provide commands to controller 212 via controller line 218.

Power buses 220 may include a conduction path for delivering power to power consumer 202 and may provide a common voltage rail that is shared among parallel power supplies 206-210. In addition, power buses 220 may include circuitry and/or electronic devices (e.g., a field effect transistor (FET), a diode, etc.) that prevent currents from flowing into a failed parallel power supply. Consequently, if one of parallel power supplies 206-210 fails, the failed power supply may not draw current via power buses 220.

Power switch line 222 may carry commands from controller 212 to turn off/on power switch 220 to electrically couple/decouple parallel power supplies 206-210 from power consumer 202.

Figure 3:
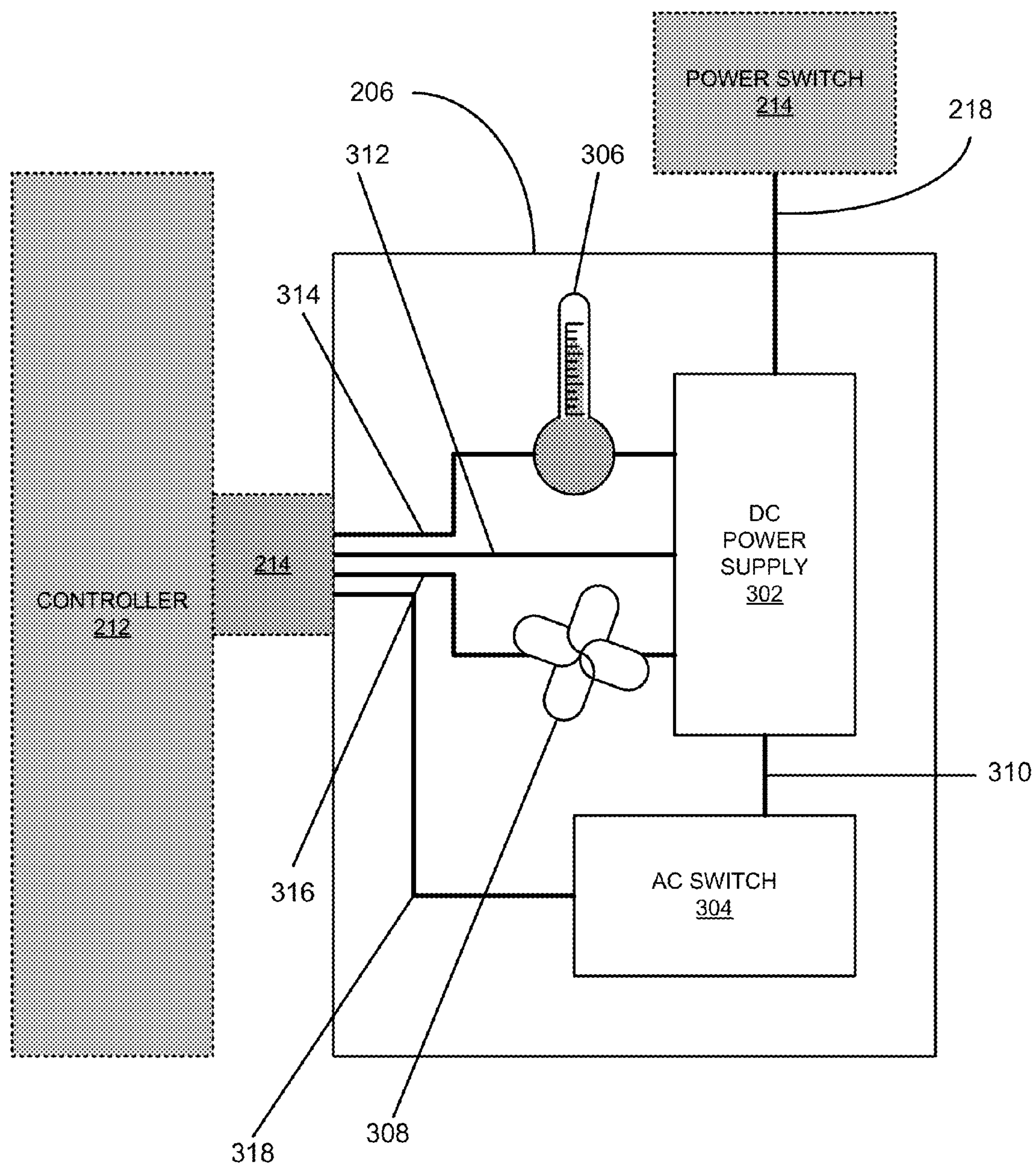
FIG. 3 is a block diagram of a parallel power supply of FIG. 2.

FIG. 3 is a block diagram of parallel power supply 206. As shown, parallel power supply 206 may include a DC power supply 302, an alternating current (AC) switch 304, a temperature sensor 306, a fan speed sensor 308, an AC power line 310, a power sensing line 312, a temperature line 314, a fan speed line 316, and an AC switch line 318. Depending on implementation, parallel power supply 206 may include fewer, additional, or different components than those depicted in FIG. 3.

DC power supply 302 may include a device for converting AC to DC and for providing the DC to power consumer 202 through power buses 220. AC switch 304 may control whether AC is sourced to DC power supply 302, depending on a signal that is received from controller 212 via AC switch line 318. If controller 212 determines that parallel power supply 206 is to be placed in a stand-by mode, controller 212 may cause AC switch 304 to prevent the AC from reaching DC power supply 302.

Temperature sensor 306 may provide controller 212 with temperature of DC power supply 302. Fan speed sensor 308 may provide controller 212 with the speed of a fan (not shown) that may be included in parallel power supply 206.

AC power line 310 may provide a conductive path for AC to be delivered from AC switch 304 to DC power supply 302. Power sensing line 312 may send information related to power levels at DC power supply 302 to controller 212. Based on the information from power sensing line 312, controller 212 may determine whether DC power supply 302 has failed. Temperature line 314 and fan speed line 316 may communicate temperature and fan speed, respectively, to controller 212. AC switch line 318 may carry commands from controller 212 to power switch 214 and AC switch 304.

Figure 4:
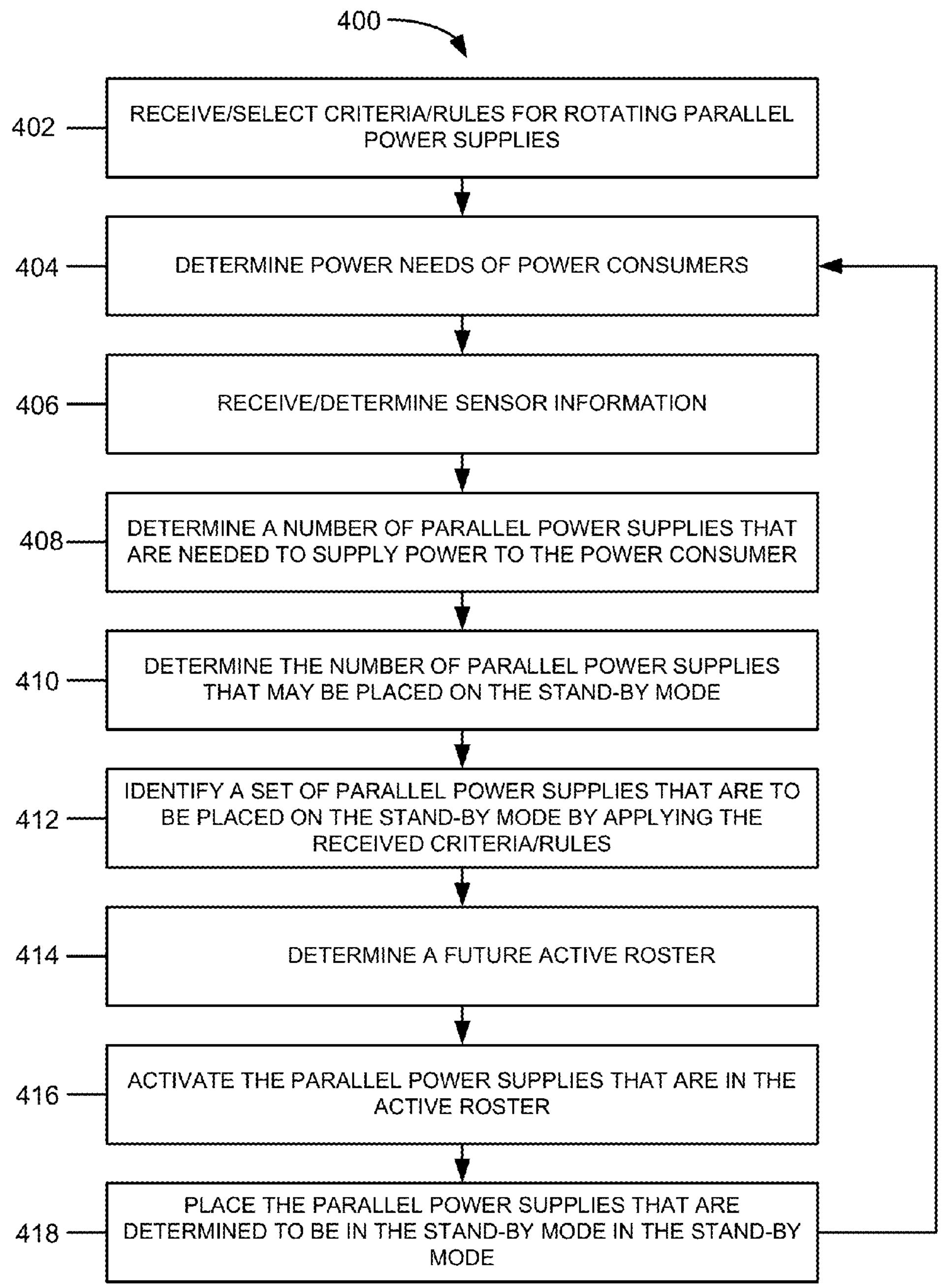
FIG. 4 is a flow diagram of an exemplary process for increasing mean time between failures of a parallel power supply of FIG. 2.

Exemplary Processes for Increasing Mean Time Between Failures for Power Supplies The above paragraphs describe system elements that are related to devices and/or components for increasing MTBF of parallel power supplies 206-210 in RPS module 204. FIG. 4 is a flowchart of an exemplary process 400 that is capable of being performed by one or more of these devices and/or components.

Process 400 may start at block 402, where criteria/rules for rotating parallel power supplies 206-210 may be received (e.g., a rule to place a parallel power supply in the stand-by mode if fan speed reaches a threshold and if other active parallel power supplies can deliver sufficient power to a power consumer). In one implementation, the criteria/rules for rotating parallel power supplies may be inputted by a user at a management station or a computer and sent to controller 212 via a network. In different implementations, the criteria/rules may be programmed or hardwired in controller 212.

Sensor information may be received/determined (block 404). For example, temperature of DC power supply 302 and/or fan speed may be received at controller 212 from temperature sensor 306 and/or fan speed sensor 308. In another example, power levels at DC power supply 302 may be determined based on signals that are carried by power sensing line 312.

Power needs of a power consumer may be determined (block 406). In one implementation, the power needs may be determined based on the amount of power that is delivered to the power consumer from RPS module 204. In another implementation, the power needs may be based on information that is inputted by a user.

A number of parallel power supplies that are needed to supply power to the power consumer may be determined (block 408). The number may be determined based on the power needs of the power consumer, the amount of power each parallel power supply is capable of delivering, and/or the received criteria/rules. For example, if the power needs of the power consumer is 1000 watts, each parallel power supply is capable of delivering 300 watts, and the received criteria/rules require the parallel power supplies to be capable of delivering at least 150% of power that is being consumed at the power consumer, the total number of parallel power supplies that are needed may be computed as 1000 watts×150%/300 watts per parallel power supply=5 parallel power supplies.

The number of parallel power supplies that may be placed in the stand-by mode may be determined (block 410). The number may be determined by subtracting the number of parallel power supplies that are needed to supply the power to the power consumer from the total number of parallel power supplies that are healthy. For example, assume that the total number of healthy parallel power supplies is 10, and the number of parallel power supplies that are needed to provide power to the power consumer is 5. The number of parallel power supplies that may be placed in the stand-by mode is 10−5=5.

A set of parallel power supplies that are to be placed in the stand-by mode may be identified by applying the received criteria/rules (block 412). For example, if RPS module 204 includes 10 healthy parallel power supplies, controller 212 may proceed to apply the criteria/rules to the healthy parallel power supplies and rank the healthy parallel power supplies by the extent that the healthy parallel power supplies match the criteria/rules. For example, if the criteria/rules for selecting parallel power supplies are high temperature, controller 212 may rank the parallel power supplies by their temperature. In some situations, due to constraints on power, no parallel power supplies may be placed in the stand-by mode.

The criteria/rules may specify different types of factors and/or information for identifying a set of parallel power supplies that may be placed in the stand-by mode. For example, in one implementation, the criteria/rules may specify an average fan speed of each parallel power supplies over a particular amount of time. In another implementation, the criteria/rules may specify a function of temperature, fan speed, and/or other types of sensor information.

In some implementations, the criteria/rules may simply rank the parallel power supplies based on a simple strategy, such as a round-robin scheme. In the round-robin scheme, each set of parallel power supplies that have been placed in the stand-by mode may be given a time tag, and the set of parallel power supplies that have the oldest tag may be selected for the stand-by mode.

In other implementations, the criteria/rules may include a deficit round-robin scheme. In the deficit round-robin scheme, the set of parallel power supplies with the oldest time tag may be provided with a score that is decremented each time the deficit round-robin is applied. If the resulting score becomes less than a particular threshold (e.g., "0"), the set of parallel power supplies with the oldest time tag may be selected to be placed in the stand-by mode. To continue the deficit round-robin, the next set of parallel power supplies with the oldest time tag may be provided with a score.

In still other implementations, the set of parallel power supplies that are to be placed in the stand-by mode may be selected based on a combination of different types of sensor information and/or strategies.

An active roster may be determined (block 414). The active roster may include a set of parallel power supplies that are not in the set of healthy parallel power supplies that are to be placed in the stand-by mode.

The parallel power supplies that are in the active roster may be activated (block 416). To activate a parallel power supply in the active roster, controller 212 may enable AC power line 310 in the parallel power supply by turning on AC switch 304. If a power consumer that is electrically coupled to power bus 220 is not shorted and power switch 214 is off, controller 212 may turn on power switch 214 so that the power consumer can receive power from the activated parallel power supply.

The parallel power supplies that are determined to be placed in the stand-by mode may be placed in the stand-by mode (block 418). To place a parallel power supply in the stand-by mode, controller 212 may disable AC power line 310 connected to that power supply by turning off AC switch 304.

From block 418, process 400 may return to block 404 to repeat blocks 404-418. As process 400 repeats blocks 404-418, operating conditions of RPS module 204 may change (e.g., plugging in a new device to RPS module 204, changing temperatures of parallel power supplies 206-210, a failure of a parallel power supply, etc.) or power requirements of RPS module 204 may change (e.g., the power required by the power consumer may change). Consequently, the number of parallel power supplies that are needed to supply the power consumer may change, as well as the set of parallel power supplies that can be placed in the stand-by mode.

During the operation of RPS module 204 in accordance with process 400, placing a number of parallel power supplies in the stand-by mode may alleviate stress that is placed on some of the parallel power supplies, and therefore, may increase the lifetime of the parallel power supplies and their MTBF. The stress may be caused by different factors, such as heat in DC power supply 302 or at a fan within RPS module 204, excessive current from DC power supply 302, etc. In some situations, the stress may be caused by wiring configuration of the parallel power supplies 206-210 with respect to power consumers. For example, in some implementations, parallel power supplies 206-210 may be sensitive to small differences in resistance at different points at power buses 220. Because of the sensitivity, the parallel power supplies that are connected by shorter buses to the power consumers may be forced to provide a disproportionately large share of the power that is supplied to the power consumer.

In other situations, the stress may be caused by minor differences between parallel power supplies 206-210 in RPS module 204. For example, each of parallel power supplies 206-210 may be manufactured with a slightly different internal resistance. In such cases, the differences may cause one or more of parallel power supplies 206-210 to produce more power than others. By placing some of the parallel power supplies in the stand-by mode and rotating parallel power supplies that are in the active roster, stress that is placed on the parallel power supplies may be reduced. Consequently, the MTBF of the parallel power supplies, as well as the reliability of RPS module 204, may be increased.

Example

Figure 5:
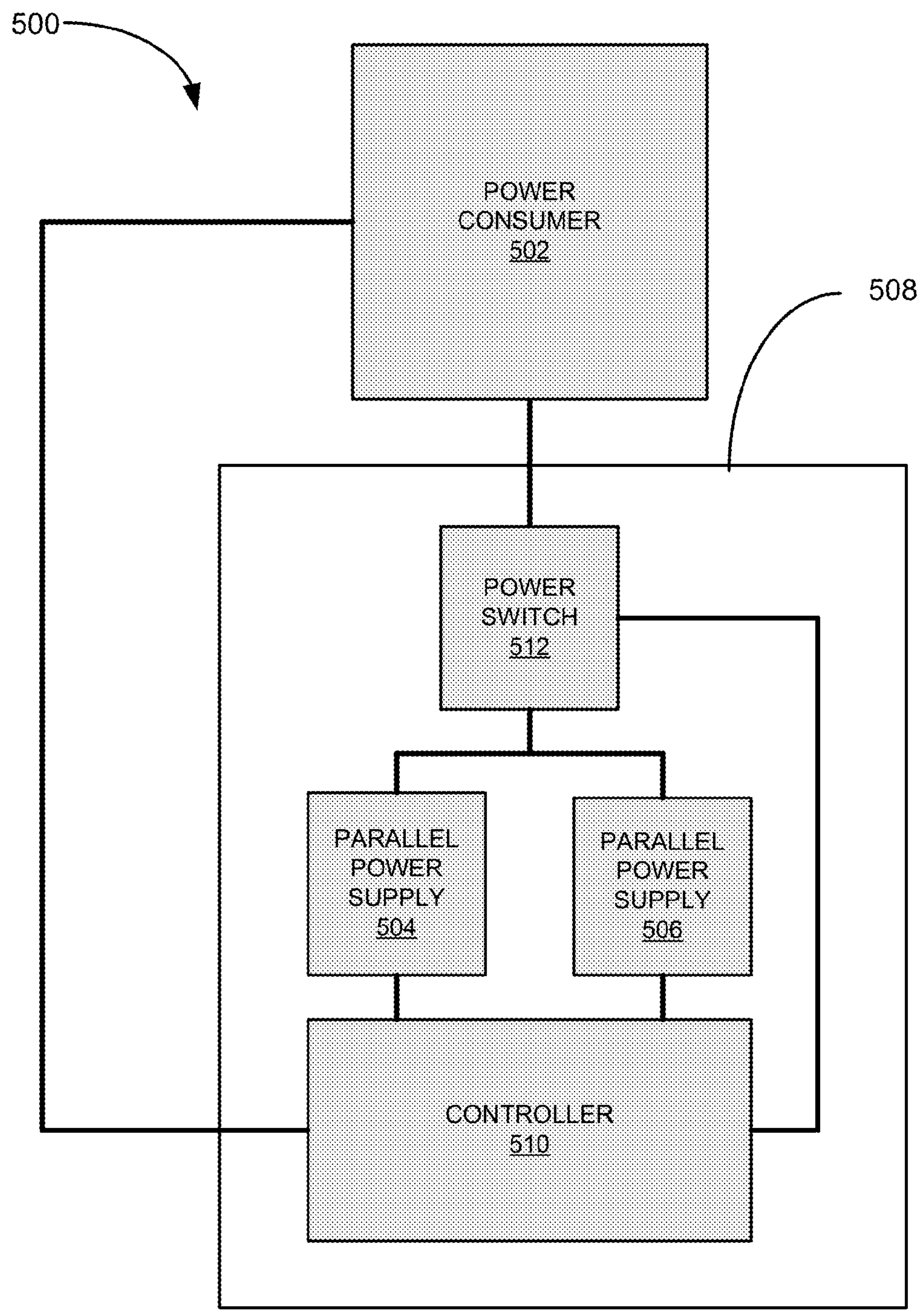
FIG. 5 shows an embodiment of the RPS system of FIG. 1.

The following example illustrates the process for increasing the MTBF of parallel power supplies in a RPS module, with reference to FIG. 5. The example is also consistent with the exemplary process described above with reference to FIG. 4.

In the example, as illustrated in FIG. 5, assume that a system 500 includes a power consumer 502 that does not have an internal power supply; that power consumer 502 is connected to parallel power supplies 504 and 506; and that RPS module 508 includes parallel power supplies 504 and 506, a controller 510, and power switch 512. Further, assume that a user has inputted a criterion/rule for rotating parallel power supplies 504 and 506 via a management station that is connected to RPS module 508, that each parallel power supply is capable of delivering 300 watts, and that the criterion/rule is to try to place parallel power supplies that operate above 70 degrees Celsius (° C.) in the stand-by mode.

RPS module 508 monitors power consumer 502 and determines that power consumer 502 needs 300 watts. In addition, RPS module 508 receives temperature readings from parallel power supplies 504 and 506 as 68° C. and 72° C., respectively. Based on the temperatures of parallel power supplies 504-506 and the projected power consumption of power consumer 502, controller 510 determines that only one parallel power supply needs to supply power to power consumer 502, and that parallel power supply 506 can be placed in the stand-by mode. Parallel power supply 504 is placed on the active roster.

Controller 510 activates parallel power supply 504 and places parallel power supply 506 in the stand-by mode, by sending commands to AC switches and power switches that are included in parallel power supplies 504-506.

Controller 510 continues to perform process 400 to rotate parallel power supplies. For example, when parallel power supply 506 cools down to 69° C. and parallel power supply 504 heats up to 71° C., controller 510 places parallel power supply 504 in the stand-by mode and parallel power supply 506 in the active roster.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, while a series of blocks has been described with regard to processes illustrated in FIG. 4, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:

determining, by a device, power needs of a power consumer;

determining, by the device, a first quantity of power supplies that are needed based on the power needs;

determining, by the device, a second quantity of power supplies that are to be placed in a stand-by mode based on the first quantity of power supplies that are needed;

identifying, by the device, one or more power supplies based on the second quantity of power supplies; and placing, by the device, the one or more power supplies into the stand-by mode.

2. The method of claim 1, further comprising:

determining one or more other power supplies for an active roster of power supplies; and activating at least one power supply of the one or more other power supplies for the power consumer to receive power from the at least one power supply.

3. The method of claim 1, further comprising:

rotating a first power supply, of the one or more power supplies, to supply power to the power consumer while placing a second power supply, of one or more other power supplies that are active, into the stand-by mode.

4. The method of claim 1, further comprising:

determining an operating parameter of a particular power supply of a set of active power supplies;

determining that the operating parameter satisfies a threshold; and placing the particular power supply into the stand-by mode after determining that the operating parameter satisfies the threshold.

5. The method of claim 4, where placing the particular power supply into the stand-by mode comprises:

determining that one or more other power supplies, of the set of active power supplies, are sufficient for the power needs of the power consumer, and placing the particular power supply into the stand-by mode after determining that the operating parameter satisfies the threshold and that the one or more other power supplies are sufficient for the power needs of the power consumer.

6. The method of claim 4, where the operating parameter is one of a temperature or a fan speed.

7. The method of claim 1, where determining the first quantity of power supplies comprises:

determining a first amount of power each power supply of the device is capable of delivering, determining a second amount of power to be delivered to the power consumer based on the power needs and one or more rules, the second amount of power being greater than the power needs, and determining the first quantity of power supplies that are needed based on the first amount of power and the second amount of power.

8. The method of claim 1, where determining the second quantity of power supplies comprises:

determining a total quantity of parallel power supplies that are healthy, and determining the second quantity of power supplies based on a difference between the total quantity of parallel power supplies that are healthy and the first quantity of power supplies.

9. The method of claim 1, where identifying the one or more power supplies comprises:

determining a ranking of parallel power supplies based on one or more rules, and selecting the one or more power supplies, from the healthy power supplies, based on the ranking of the healthy power supplies.

10. A system comprising:

a controller to:

determine a particular quantity of power supplies that are to be placed in a stand-by mode, identify a first set of power supplies, of a plurality of power supplies, that are to be placed in the stand-by mode based on the particular quantity of power supplies, identify a second set of power supplies, of the plurality of power supplies, for an active roster of power supplies, activate at least one power supply, of the second set of power supplies, for the at least one power supply to supply power to a power consumer, and place the first set of power supplies into the stand-by mode.

11. The system of claim 10, where the controller is further to:

determine a current amount of power required by the power consumer after placing the first set of power supplies into the stand-by mode, and activate a particular power supply, of the first set of power supplies, when the current amount of power required is greater than a previous amount of power required by the power consumer.

12. The system of claim 10, where the controller is further to:

determine a current amount of power required by the power consumer after placing the first set of power supplies into the stand-by mode, determine a first quantity of power supplies that are needed to supply power to the power consumer based on the current amount of power required by the power consumer, and place a particular power supply, of the second set of power supplies, into the stand-by mode when a second quantity of power supplies in the second set of power supplies is greater than the first quantity of power supplies.

13. The system of claim 10, where the controller is further to:

rotate a first power supply, of the first set of power supplies, to supply power to the power consumer while placing a second power supply, of the second set of power supplies, into the stand-by mode.

14. The system of claim 10, where the controller is further to:

determine an operating parameter of a particular power supply of the second set of power supplies, determine that the operating parameter satisfies a threshold, and place the particular power supply into the stand-by mode after determining that the operating parameter satisfies the threshold.

15. The system of claim 10, where, when identifying the first set of power supplies, the controller is to:

determine a ranking of the plurality of power supplies based on one or more rules, and select the first set of power supplies, from the plurality of power supplies, based on the ranking of the plurality of power supplies and the particular quantity of power supplies.

16. The system of claim 15, where the ranking of the plurality of power supplies is based on one or more of first information regarding temperature, second information regarding fan speed, or third information regarding time tags associated with the plurality of power supplies.

17. A device comprising:

a controller to:

determine a particular quantity of power supplies that are to be placed in a stand-by mode, identify a first set of power supplies that are to be placed in the stand-by mode based on the particular quantity, identify a second set of power supplies for an active roster of power supplies, activate the second set of power supplies for the second set of power supplies to supply power to a power consumer, and place the first set of power supplies into the stand-by mode.

18. The device of claim 17, where, when determining the particular quantity of power supplies that are to be placed in the stand-by mode, the controller is to:

determine another quantity of power supplies that are needed to supply the power to the power consumer, determine a total quantity of parallel power supplies that are healthy, and determine the particular quantity based on a difference between the totally quantity and the other quantity.

19. The device of claim 17, where, when determining the particular quantity of power supplies that are to be placed in the stand-by mode, the controller is to:

determine power needs of the power consumer, determine an amount of power supplied by each power supply, determine another quantity of power supplies that are needed based on the power needs and the amount of power, and determine the particular quantity based on the other quantity.

20. The device of claim 19, where the controller is further to:

determine an operating parameter of a particular power supply of the second set of power supplies, determine that the operating parameter satisfies a threshold, and place the particular power supply into the stand-by mode after determining that the operating parameter satisfies the threshold.

* * * * *